Oct. 9, 1945. W. I. HANRAHAN 2,386,311
METHOD OF MAKING AND ATTACHING DRUM CHIMES AND HEADS
Filed May 14, 1943 2 Sheets-Sheet 1
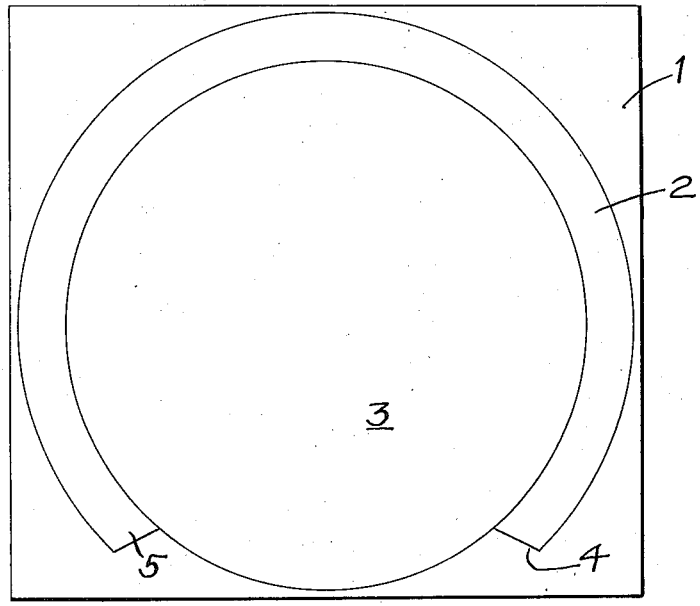
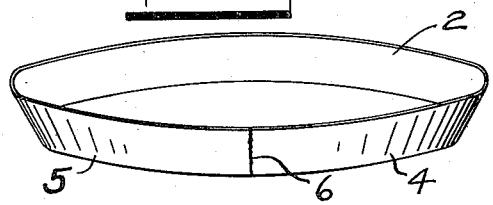
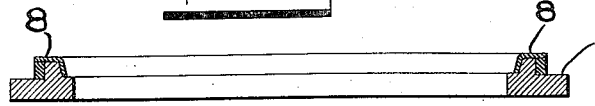
INVENTOR
WILLIAM I. HANRAHAN
BY Daly Darby
ATTORNEYS

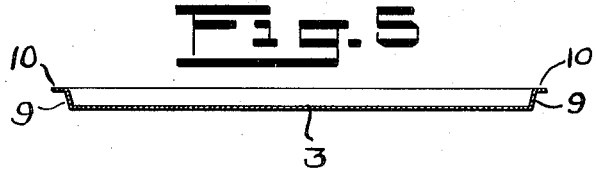
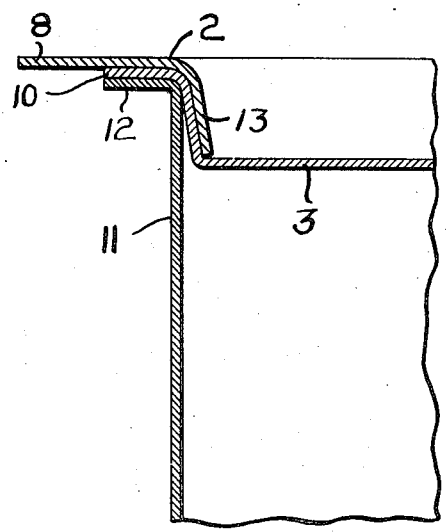
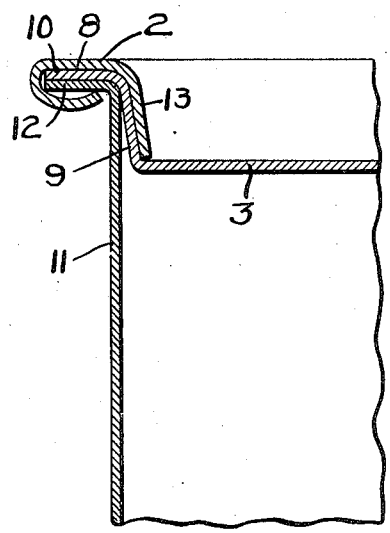
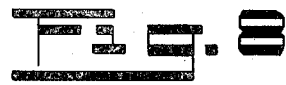
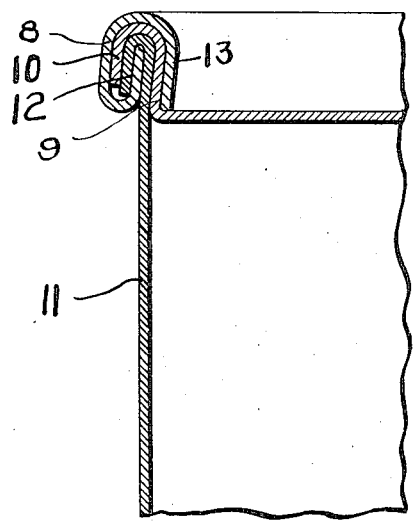

UNITED STATES PATENT OFFICE 2,386,311

METHOD OF MAKING AND ATTACHING DRUM CHIMES AND HEADS

William I. Hanrahan, Bronxville, N. Y., assignor, by mesne assignments, to United States Steel Products Company, Sharon, Pa., a corporation of Delaware Application May 14, 1943, Serial No. 486,994

2 Claims. (Cl. 113—121)

The invention relates to the method of making drum chimes and drum heads and also to the method of attaching the same to a drum structure.

One of the objects of the invention is to provide a simple and efficient method of making a chime for use in securing a drum head to a drum.

A further object of the invention is to provide a method of making a chime ring and a drum head from one blank of metallic material for use in connection with a drum structure.

A further object is to provide a novel method of attaching a chime and a drum head to a drum and so that said chime and head will be securely held in place with respect to the drum.

Other objects of the invention will become apparent from the following detailed description, reference being had to the accompanying drawings, wherein:

Figure 1 is a plan view of a blank of metallic material from which is produced the chime and the drum head;

Figure 2 is a perspective view of the chime after being taken from the blank of metallic material and after it has been formed into a ring by the welding of its ends together;

Figure 3 is a sectional view of the chime ring in position in the lower portion of a die used for shaping the ring for use in carrying out the objects of my invention;

Figure 4 is a sectional view of the chime ring in position in the lower portion of the die and after the shaping operation has been completed;

Figure 5 is a sectional view of the drum head taken from the metallic blank of material and after it has been shaped for use in connection with a drum; and Figures 6, 7 and 8 are detail sectional views indicating the steps taken in securing the chime and drum head in place with respect to a drum body in accordance with my invention.

Referring more particularly to the several views of the drawings, it will be noted from Figure 1 that I propose to stamp out or cut a blank to form the chime and the drum head, from the same piece of metallic material indicated at 1. The chime blank to be taken from the metallic material, which is U-shaped in form, is indicated in this figure at 2 and the circular shaped drum head is indicated at 3. By producing the chime blank and the drum blank in this manner the operation can be simply and efficiently accomplished in one operation, and with a considerable saving of material.

After the U-shaped blank for the chime has been taken from the metallic material 1, its ends 4 and 5 are flash welded together as indicated at 6 in Figure 2, and so that the said blank will be formed into a ring. The chime ring thus formed is then placed in a suitable die, indicated at 7 in Figure 3, and said die causes the metal of the chime ring to be bent so that a horizontally extending flanged portion 3 is formed around its upper edge.

The drum head blank 3, after being stamped or cut out of the metallic material 1, is also caused to be shaped by a suitable die and so that it is formed into a cup shaped structure as shown in Figure 5, which has the angularly and upwardly extending side portion 9 and the horizontally extending flanged portion 10.

In the sectional views of Figures 6, 7 and 8, I have indicated the steps taken, in accordance with my invention, for securing the chime ring 2 and the drum head 3 to a drum. In these figures the drum is indicated by the numeral 11. The drum is provided with an open end having a rim portion formed with a flange 12. The drum head 3 is adapted to be fitted into the open end of the drum and so that its flanged portion 10 will rest upon the flange 12. Then the chime ring 2 is positioned with respect to the drum head and drum, as shown in Figure 7, and so that its side portion will lie against the side portion 9 of the drum head and its flanged upper edge 8 will rest on top of the flange 10 of said drum head.

After the chime and drum head are thus assembled with respect to the drum, a suitable sealing mechanism is then employed to bend the flanged portions of the chime ring, drum head, and the drum rim, so that they will become securely interlocked with each other and will be formed into a rounder upper edge for the drum as shown in Figure 8.

It will be noted from an examination of Figures 6, 7 and 8 that during the operation of the sealing mechanism, the flange 8 of the chime ring is first bent over and under the flanges 10 and 12 of the drum head and drum as indicated in Figure 7, and then all three of said flanges are further bent into the interlocking engagement shown in Figure 8. It will be further noted that during the operation of the sealing mechanism the side wall of the drum is caused to be distorted slightly inwardly (see Fig. 8) so as to engage the side wall of the drum head 3, and the side wall 9 of the drum head, and the side wall 13 of the chime ring are caused to be bent outwardly so as to provide a liquidtight joinder of the drum head and the drum.

It is also contemplated in carrying out the objects of my invention that the flange 10 of the drum head may be made of the same width as the flange 8 of the chime and that during the operation of the sealing mechanism the flange 8 of the chime ring and the flange 10 of the drum head be first bent together over and under the flange 12 of the drum head, and then all three of said flanges bent into interlocking engagement as indicated in Figure 8.

What is claimed is:

1. A method of providing a closure for a metallic drum consisting in stamping out of sheet metal a circular shaped blank, pressing the circular shaped blank into a cup shaped closure which has a circular flat portion of the proper size to provide a closure for the drum, and so that it has an outwardly inclined side wall, and a horizontally extending flange at its upper edge adapted to fit over a previously provided flange at the upper edge of the drum, then forming a chime ring from a flat piece of metal with its lower edge circumference less than the circumference of its upper edge and so that said ring will overlap the side wall of the cup shaped closure body, then bending the metal of the upper edge of the ring to form a horizontally extending flange adapted to fit over the flange of the closure body, said flange being of a greater width than the flange formed on the cup shaped closure body, bending the extended portion of the flange of the chime ring over and around the flanges of the cup shaped closure body and the drum, bending the flanged portions of the cup shaped closure body, chime ring and drum together against the side wall of the drum to form a rounded reinforced top edge for the drum, said last bending being carried to the point whereby the side wall of the drum is distorted inwardly to engage the side wall of the closure body and the side walls of the closure body and chime ring are bent outwardly to place the members in intimate contact and to effect a liquidtight seal.

2. A method of providing a closure for a metallic drum consisting in stamping out of sheet metal a circular shaped blank, pressing the circular shaped blank into a cup shaped closure which has a circular flat portion of the proper size to provide a closure for the drum, and so that it has an outwardly inclined side wall, and a horizontally extending flange at its upper edge adapted to fit over a previously provided flange at the upper edge of the drum, then forming a chime ring from a flat piece of metal with its lower edge circumference less than the circumference of its upper edge and so that said ring will overlap the side wall of the cup shaped closure body, then bending the metal of the upper edge of the ring to form a horizontally extending flange adapted to fit over the flange of the closure body, bending the flanged portions of the closure body, chime ring and drum together against the side wall of the drum to form a rounded reinforced top edge for the drum, said last bending being carried to the point where the side wall of the drum is distorted inwardly to engage the side wall of the closure body and the side walls of the closure body and chime ring are bent outwardly to place the members in intimate contact and to effect a liquidtight seal.

WILLIAM I. HANRAHAN.